(12) United States Patent
Shah et al.

(10) Patent No.: US 7,139,821 B1
(45) Date of Patent: Nov. 21, 2006

(54) METHOD AND APPARATUS FOR CREATING AND DEPLOYING APPLICATIONS FROM A SERVER APPLICATION

(75) Inventors: Pallavi Shah, Mountain View, CA (US); Keith Deutsch, Palo Alto, CA (US); Gerard Fernando, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1052 days.

(21) Appl. No.: 09/693,355

(22) Filed: Oct. 20, 2000

(51) Int. Cl.
*G06F 15/173* (2006.01)
*G06F 13/00* (2006.01)
*G06F 15/16* (2006.01)

(52) U.S. Cl. .................. 709/224; 709/203; 719/310

(58) Field of Classification Search ............... 709/224, 709/203, 204, 223; 719/310
See application file for complete search history.

(56) References Cited

U.S. PATENT DOCUMENTS

| | | | |
|---|---|---|---|
| 5,325,527 A | | 6/1994 | Cwikowski et al. |
| 5,369,707 A | * | 11/1994 | Follendore, III ............ 713/155 |
| 5,919,247 A | | 7/1999 | Van Hoff et al. |
| 5,923,328 A | * | 7/1999 | Griesmer .................... 715/854 |
| 6,216,134 B1 | * | 4/2001 | Heckerman et al. ...... 707/104.1 |
| 6,311,179 B1 | * | 10/2001 | Agarwal et al. ................ 707/3 |
| 6,325,527 B1 | * | 12/2001 | Lee .............................. 362/492 |
| 6,434,594 B1 | * | 8/2002 | Wesemann ................... 709/201 |
| 6,477,572 B1 | * | 11/2002 | Elderton et al. ............. 709/224 |
| 6,601,072 B1 | * | 7/2003 | Gerken, lll ............... 707/103 R |
| 6,604,127 B1 | * | 8/2003 | Murphy et al. .............. 709/203 |
| 6,665,714 B1 | * | 12/2003 | Blumenau et al. ........... 709/222 |
| 6,687,735 B1 | * | 2/2004 | Logston et al. .............. 709/203 |
| 6,812,941 B1 | * | 11/2004 | Brown et al. ................ 715/854 |
| 2002/0194242 A1 | * | 12/2002 | Chandrasekaran et al. .. 709/101 |

FOREIGN PATENT DOCUMENTS

EP 0957617 11/1999

OTHER PUBLICATIONS

Jim Waldo, Jini™ Architecture Overview, Sun Microsystems, Inc., 1998, {http://www.java.sun.com/jini/whitepapers/}.
Why Jini Now?, Sun Microsystems, Inc., Aug. 1998, {http://www.java.sun.com/jini/whitepapers/}.

(Continued)

*Primary Examiner*—Bunjob Jaroenchonwanit
*Assistant Examiner*—Ramsey Rafai
(74) *Attorney, Agent, or Firm*—Meyertons Hood Kivlin Kowert & Goetzel, P.C.; Roy D. Rankin

(57) ABSTRACT

In a system where client and server components (or actors) of an application are organized as complementary hierarchical graphs, a method and apparatus for creating server applications and dynamically deploying server applications on a client system are described. The server graph comprises, as a minimum, server nodes corresponding to the union of all possible client nodes, whereas each client graph corresponds to a subset of the related server nodes. The server graph is a compound tree from which all possible combinations of client trees can be dynamically created. At a desired time, for example, when the client requests for a client tree representation, the server creates the client tree representation using a peeling process to determine which nodes in the server actor tree should be included in the client tree representation. The peeling process involves determining the server actor nodes that meet a set of criteria for the particular client. The generated client tree structure contains objects that are shipped via a secured communication interface to the client in a tree structure.

30 Claims, 7 Drawing Sheets

OTHER PUBLICATIONS

Jini™ FAQs, Sun Microsystems, Inc., Dec. 9, 1998, {http://java.sun.com/jini/faqs}.

What is Jini?, Jini™ White Paper, Sun Microsystems, Inc., {http://java.sun.com/products/jini}.

* cited by examiner

METHOD AND APPARATUS FOR CREATING AND DEPLOYING APPLICATIONS FROM A SERVER APPLICATION

BACKGROUND OF THE INVENTION

1. Field of the Invention

This invention relates to the field of computer applications, and, more specifically, to object-oriented client-server applications.

Sun, Sun Microsystems, the Sun logo, Java, Java 3D and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

In monolithically designed object-oriented computer applications, program code is developed as a collection of objects linked as an "object web." Each object encapsulates its own data, as well as methods for operating on that data. In the execution of the application, messages are sent between objects, calling the various methods to implement the application. However, more and more frequently, applications are being designed as distributed in nature. That is, elements of the application may exist in separate execution environments, sometimes resident within the same computer system, but more often executed in multiple computer systems coupled via a network. An example of such a distributed scheme is the client-server paradigm. Unfortunately, as described below, it is difficult for monolithic distributed applications to provide efficient communication between the distributed elements of the application.

In a client-server application, the functionality of the application is split between two primary locations, i.e., the "client" and the "server." In many cases, the same server will interface with multiple clients, e.g., for common access to a database or shared services. In this type of environment, for a monolithically designed application, communication is generalized into simple client-server messages transmitted over a common communication channel.

Typically, one communication object or component of the client receives all outgoing message requests from the application objects local to the client. Those outgoing message requests are packaged (e.g., as a network packet) and sent via the common channel to the server. At the server, another communication object receives the packaged message. The communication object, or other server resident object, must then determine what the message is regarding (i.e., what is the message context) and which object on the server should handle the message. It is possible that the message will be processed in this manner by multiple objects before being forwarded to the desired target object on the server. The same communication procedure is repeated over the common communication channel for communications originating from the server for processing by the client.

The process of determining the message context and identifying the appropriate target object can be non-trivial, particularly for large applications. Because the application is monolithic in nature, it may not be obvious which object should handle a message having a particular context. Extra effort may be needed to predetermine what sort of message contexts each object can handle, and organize this predetermined information into a useful format. The application structure must then remain fixed in order for this predetermined information to remain valid. Constraining the application to a static configuration in this way undesirably eliminates any dynamic flexibility in the application, making improvements and alterations to the application more complicated. Efforts are thus needed to improve the efficiency of communication in distributed applications without constraining the flexibility of those applications.

Improving communication in distributed applications require a complex operating architecture and creates a challenge for the designer by requiring development of server side objects and, possibly, multiple client side objects for different clients communicating with the same server side object. Thus, a method is needed to improve design of architectures for distributed applications.

Efforts in the organization of applications include the development of hierarchical tools referred to as "scenegraphs," which are used to organize rendering applications as directed acyclic graphs. A description of scenegraph techniques is provided below.

Scenegraph Techniques

A scenegraph is a tree structure comprising a multiplicity of nodes interconnected in a hierarchical manner. This hierarchical structure provides a well-organized framework for software applications, and one in which functionality may be easily augmented through the addition of one or more nodes to an existing scenegraph. Individual functional application elements are constructed as separate node objects and connected together in a treelike structure. Those node objects are then manipulated using their predefined accessor, mutator and node-linking methods.

For reference, an object is a programming unit that groups together a data structure (one or more instance variables) and the operations (methods) that can use or affect that data. Thus, an object consists of data and one or more operations or procedures that can be performed on that data. An object can be instructed to perform one of its methods when it receives a "message." A message is a command or instruction sent to the object to execute a certain method. A message consists of a method selection (e.g., method name) and zero or more arguments. A message tells the receiving object what operations to perform.

Any given object is an "instance" of a particular class. A class provides a definition for an object which typically includes both fields (e.g., variables) and methods. (The term "object" by itself is often used interchangeably to refer to a particular class or a particular instance.) An instance of a class includes the variables and methods defined for that class. Multiple instances can be created from the same class.

In the construction of a scenegraph, a child node object is attached to a parent group node object by calling the "addChild" method of the parent node object and specifying the child node object in the input field. A reference to the child node object is then stored in the parent node object, enabling general scenegraph mechanisms, such as traversal methods, to be implemented between the parent and child node objects. Other specific mechanisms for linking child nodes may be implemented for specific node object types. Also, constraints may be placed on what types of node objects may be linked as children to other specific node types to enforce particular nodal relationships of scenegraph implementations.

Scenegraphs are currently used in graphics rendering applications. The scenegraph contains a complete description of the entire scene, or virtual universe. This includes the geometric data, the attribute information, and the viewing information needed to render the scene from a particular point of view. In the case of a 3D scene, the scenegraph hierarchy promotes a spatial grouping of geometric objects found at the leaves (i.e., end nodes) of the scenegraph. Internal nodes act to group their children together. A group node may also define a spatial bound that contains all the geometry defined by its descendants. Spatial grouping allows for efficient implementation of operations such as proximity detection, collision detection, view frustrum culling and occlusion culling.

Node objects of a scenegraph may be separated into "group node" objects and "leaf node" objects. Group node objects group together one or more child nodes, and can be used to define behavior or relationships common to those child nodes. A leaf node has no children and only one parent. The state of a leaf node includes any state in a direct path between the leaf node and the source or "root" node of the scenegraph. In the context of a graphics scene, leaf node objects contain the actual definitions of shapes (geometry), lights, fog, sound, etc. When a scene is rendered, the renderer incorporates all state changes made in a direct path from the root node of the scenegraph to a leaf node object in the drawing of that leaf node object.

FIG. 1 illustrates a general scenegraph structure used to represent a 3D scene in accordance, for example, with scenegraph policies as described in the Java 3D™ API Specification available from Sun Microsystems, Inc. The scenegraph of FIG. 1 comprises a single root node, referred to as virtual universe (VU) 100, one or more locale nodes (LO) 101, one or more branch group nodes (BG) 102, one or more group nodes (GN) 103, and one or more leaf nodes (LN) 104.

Virtual universe 100 represents the center of the scene, with all child nodes being positioned relative to it. One or more high-resolution locale nodes 101 are coupled to virtual universe 100. Each such locale node 101 specifies a relative offset position with respect to virtual universe 100. This relative offset is represented in a high-resolution format to accommodate distance relationships comparable to the smallest and largest conceived distances in the real world. Each locale node 101 may be used to attach one or more branch group nodes 102, whose rendering positions are interpreted relative to the given locale node 101.

Branch group nodes 102 generally act as a root node of a subgraph associated with the given parent locale node 101. When a branch group node 102 is attached to a locale node 101, and hence to a virtual universe 100, the branch group node and its descendants are considered "live" (i.e., ready to render) with respect to the scene. One or more general group nodes 103 may be attached as child nodes to each branch group node 102. Each group node 103 may support zero or more child nodes in the form of further group nodes 103 or leaf nodes 104.

An example of an implementation of a group node 103 is as a transform node that contains a transform matrix used to scale, rotate, and position its descendants. Other group nodes implemented as "behavior" nodes may be used to embody algorithms for modifying the transform matrices of specified transform objects. Certain leaf node objects may also have references to component objects (not shown) which specify specific attributes of the given leaf node object (e.g., a shape leaf node may have as associated component objects a geometry component object, specifying a geometric shape of the shape leaf node, and an appearance component object, specifying the appearance of the shape in terms of color, texture, etc.). One leaf node is typically used to represent the viewing platform for rendering purposes, with associated component objects for specifying attributes of the rendering viewpoint, as well as the canvas or screen on which the rendered output is to be displayed.

SUMMARY OF THE INVENTION

A method and apparatus for creating server applications and dynamically deploying server applications on a client system are described. In one or more embodiments, client and server components (or actors) of an application are organized as complementary hierarchical graphs, such as trees or directed acyclic graphs. One or more nodes in the server graph are linked via a distributed communication interface to the respective peer nodes in each of the client graphs.

In one or more embodiments, the server graph comprises, as a minimum, server nodes corresponding to the union of all possible client nodes, whereas each client graph corresponds to a subset of the related server nodes. The server graph is a compound tree from which all possible combinations of client trees can be dynamically created. The source creator or designer only needs to create the source actors, unlike in the prior art where the creator must also create the client actors.

In one or more embodiments of the present invention, the client tree representation is created at a desired time. For example, when the client requests for a client tree representation, the server creates the client tree representation using a peeling process to determine which nodes in the server actor tree should be included in the client tree representation. In one or more embodiments, the peeling process involves determining the server actor nodes that meet a set of criteria for the particular client. The generated client tree structure contains objects that are shipped, via secure communication, to the client in a tree structure. The client uses this tree representation to generate the client actor graph, thus, dynamic creation of unique client actor graphs from the compound server actor graph.

DETAILED DESCRIPTION OF THE INVENTION

Figure 1:
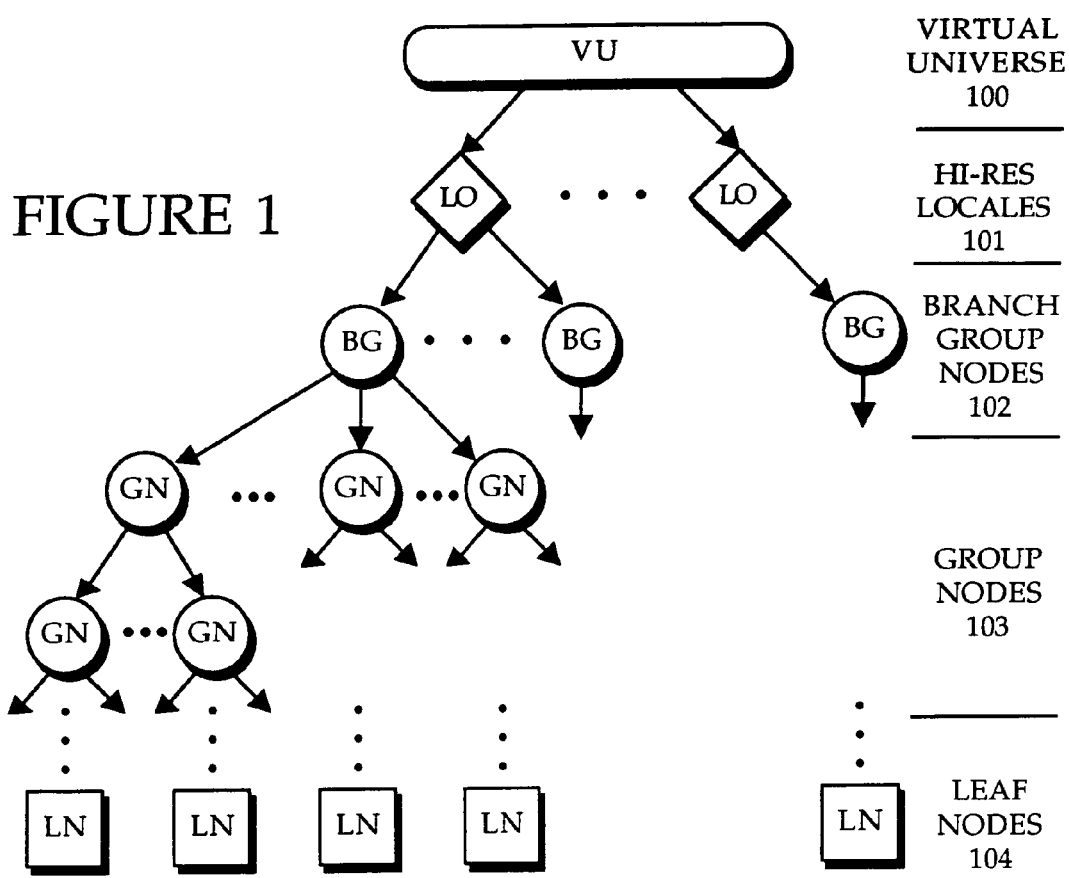
FIG. 1 is a block diagram of a general embodiment of a scenegraph for representing 3D scenes.

The invention is a method and apparatus for creating server applications and for dynamically deploying server applications on a client system. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Embodiments of the invention are directed at creating and deploying client components for applications having complementary client and server components that are organized as hierarchical graphs or trees. Example peer node architecture wherein showing applications with complementary client and server components is described in copending U.S. patent application Ser. No. 09/691,407, entitled "Method and Apparatus for Organizing Elements of a Server Application in a Client-Server System," filed on Oct. 17, 2000, and assigned to the present assignee, the specification and figures of which are herein incorporated by reference.

In the peer node structure, server application architecture utilizes object graph organization to reflect the structure of the client and to connect more intimately with the internal nodes of the client. Actors are used as building blocks for applications, where each actor is a self-contained hierarchical graph of objects. More specifically, a server application and one or more associated client applications are organized as complementary hierarchical graphs of actors, where each actor node on the client has a corresponding peer actor node on the server. Those aspects of the application that are server specific are implemented in the server actor node and are referred to as the source actor. The client specific aspects of the application are implemented in the peer actor node of the client and are referred to as the member actor. Communication between the clients and the server is performed between peer nodes so that communication protocol and context are well defined.

Where a hierarchical graph is implemented with actors, the subtrees of nodes within each actor are private with respect to one another. Separate secured runtime environments (sometimes referred to as security "sandboxes") may be used to support the execution of object code associated with actor subtrees, thus preventing, for example, one subtree from violating the memory space of another. Object code and data are therefore kept private, except where authorized access is provided by an appropriate interface.

External and often remote applications may be associated with one or more source actors in the client-server system. A distribution manager actor provides a secure interface between an external application and the corresponding source actor(s) in the server. The secure interface comprises mechanisms for attaching the external application to, and detaching from, the source actor(s) in the server, as well as for updating and retrieving data from the source actor(s).

The hierarchical graph is a directed acyclic graph such as a scenegraph. Nodes of the client and server graphs may include active nodes that function like scenegraph elements (e.g., branch group nodes), but with further control functions. Each active node in the server graph is connected with its peer in the client graph, and may also be connected to other resources, such as an external media source. For example, access control nodes are branch group nodes that determine whether, and under what terms, the subgraph below them in the hierarchy is visible or otherwise accessible to the user. In the course of making this determination, an access control node may interact with databases or other server side resources through the server resident peer node. In general, active nodes concern themselves with the portion of the actor graph at or below their point of attachment. Whereas active nodes on the client typically contain information and functions dedicated solely to that client and its user, active nodes on the server contain information and functions directed at all clients for which a corresponding peer node is implemented.

Complementary Server and Client Graphs

Figure 3:
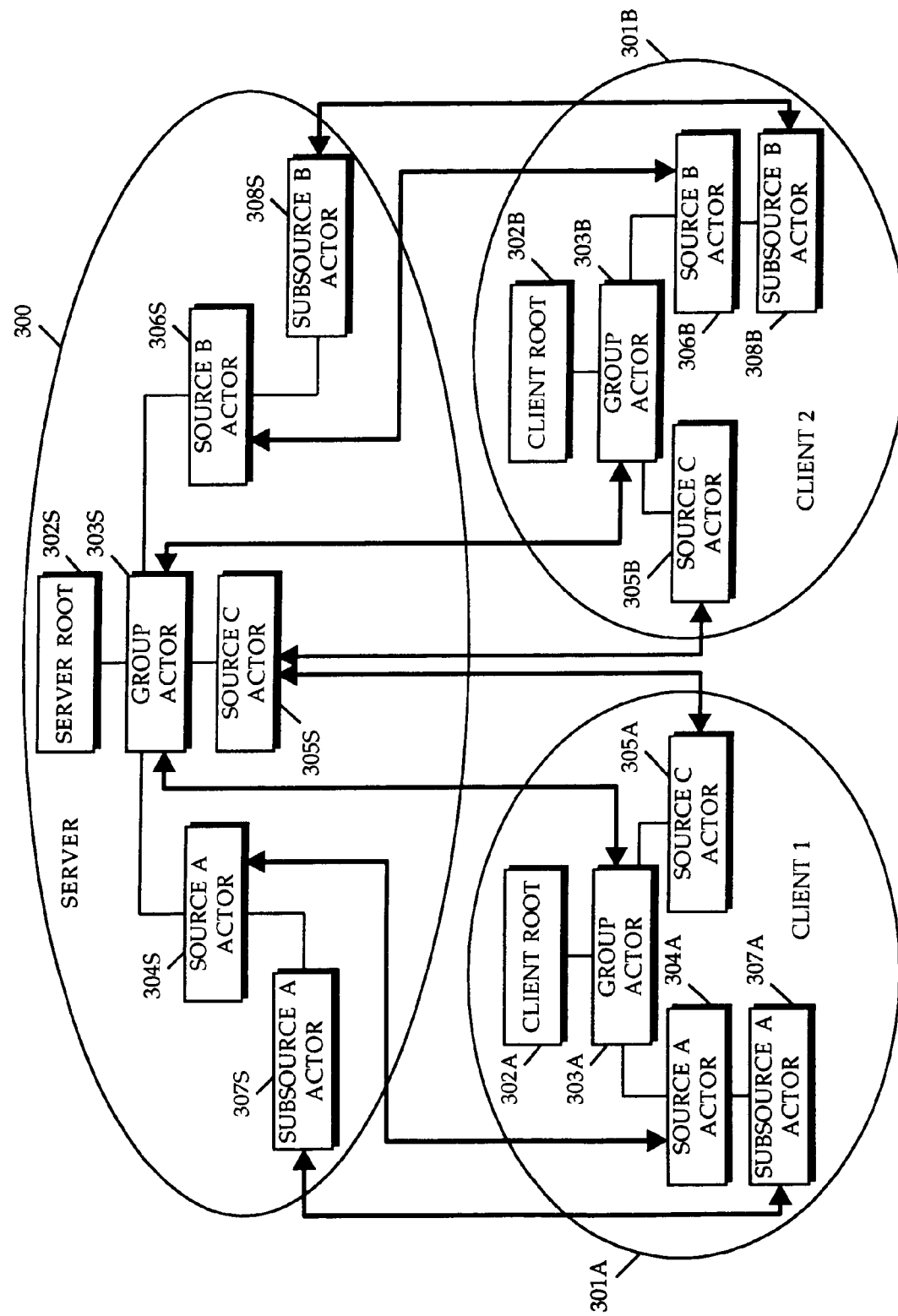
FIG. 3 is a block diagram of an example client-server application comprising complementary graphs of actors, in accordance with an embodiment of the invention.

FIG. 3 is a block diagram of an example client-server application comprising complementary graphs of actors, in accordance with one or more embodiments of the invention. The application comprises server component 300 and one or more client components (e.g., 301A and 301B). The server and client components each comprise a hierarchical graph of actors, with each client component being complementary to a subtree of the server component.

In FIG. 3, server component 300 comprises server root node 302S linked to group actor 303S. Group actor 303S acts as the group resource node from which the primary media sources of this example (i.e., source A actor 304S, source C actor 305S and source B actor 306S) are linked. Source A actor 304S and source B actor 306S are linked to subsource A actor 307S and subsource B actor 308S, respectively.

In this example, client 301A is concerned only with the media provided by source A, subsource A and source C. Actors associated with source B and subsource B are therefore not necessary to the function of client 301A and may be omitted. Otherwise, client 301A mirrors the tree of actors presented by server 300. Client component 301A comprises client root node 302A linked to group actor 303A. Group actor 303A is linked to member A actor 304A and member C actor 305A. Member A actor 304A is further linked to submember A actor 307A. As previously noted, a member actor is the version of the actor component that resides on the client and the source actor is the version of the actor component residing on the server therefore, the tree actors on the client mirror the tree actors on the server.

Unlike client 301A, client 301B is concerned with source B, subsource B and source C, but not with source A or subsource A. Therefore, the actor tree of client component 301B comprises client root node 302B linked to group actor 303B. Group actor 303B is linked to member B actor 306B and member C actor 305B. Member B actor 306B is further linked to submember B actor 308B.

Each actor within a client component is linked with its respective complementary actor in the server component. By distributing the client-server communication interface at the actor level, more directed communication is achieved. There is no need to determine the target object or context for messages transmitted between the client and server. All messages are provided directly to that portion of the object code that is configured to handle the communication. For example, in the described media application, a source actor at the server may be configured to obtain media content, and forward the media content directly to the corresponding actor at the client which is then able to efficiently render the media content. More efficient client-server interaction is thus achieved.

As shown in FIG. 3, examples of possible actors may include source and subsource actors. These may include content or media input and/or output elements that obtain content from or submit content to other remote application entities, referred to as "distribution sources" and "distribution subsources," that are linked to the server application component. An example of a distribution source may be a network entity that provides media content such as video or audio data to the server component of a cable programming or pay-per-view application. A distribution subsource may be, for example, a sponsor advertisement source that is associated with the primary source to which it is linked.

For these systems, in which client graphs contain varying subsets of the peer nodes contained in the server graph, the design, deployment, and dynamic modification of the system may be problematic. To resolve these problems, the server application is designed to contain a full superset of peer nodes for all possible client configurations such that the representation of a specific client configuration may be dynamically generated or updated from the full superset of peer nodes based on a set of access control parameters. The parameter set may be different for different clients thereby providing a peer node architecture that is flexible. For example, the parameter set may contain information about the capabilities of the client, tasks to be performed by the client, or options subscribed by the client, etc. The flexibility provided by the present invention makes it possible to dynamically determine individual client tree configurations based on user activities and external events.

One or more embodiments of the present invention teaches a server application graph with a full superset of peer nodes. The server side application design uses any set of API's (Application Program Interface) that have built-in ability to be actively accessed by a peeling mechanism. The complementary client graph is generated, one node at a time, by this peeling method. Peeling is a process whereby the server graph (actor tree) is traversed, selectively ignoring or including individual branches in the graph based on evaluation of a multiplicity of parameters. The client graph representation is subsequently transferred by a known means to one or more clients. Example mechanisms for transporting client graph information over a network are described in copending U.S. patent application Ser. No. 09/551,522, entitled "Method and Apparatus for Transport of Scenegraph Information Across a Network," filed on Apr. 18, 2000, and assigned to the present assignee, the specification and figures of which are herein incorporated by reference.

Upon receiving the client graph representation, each client uses the information to build an instance of the desired Client Object graph. Thus creating a complementary application on the client that mirrors a subset of the application on the server.

Figure 2:
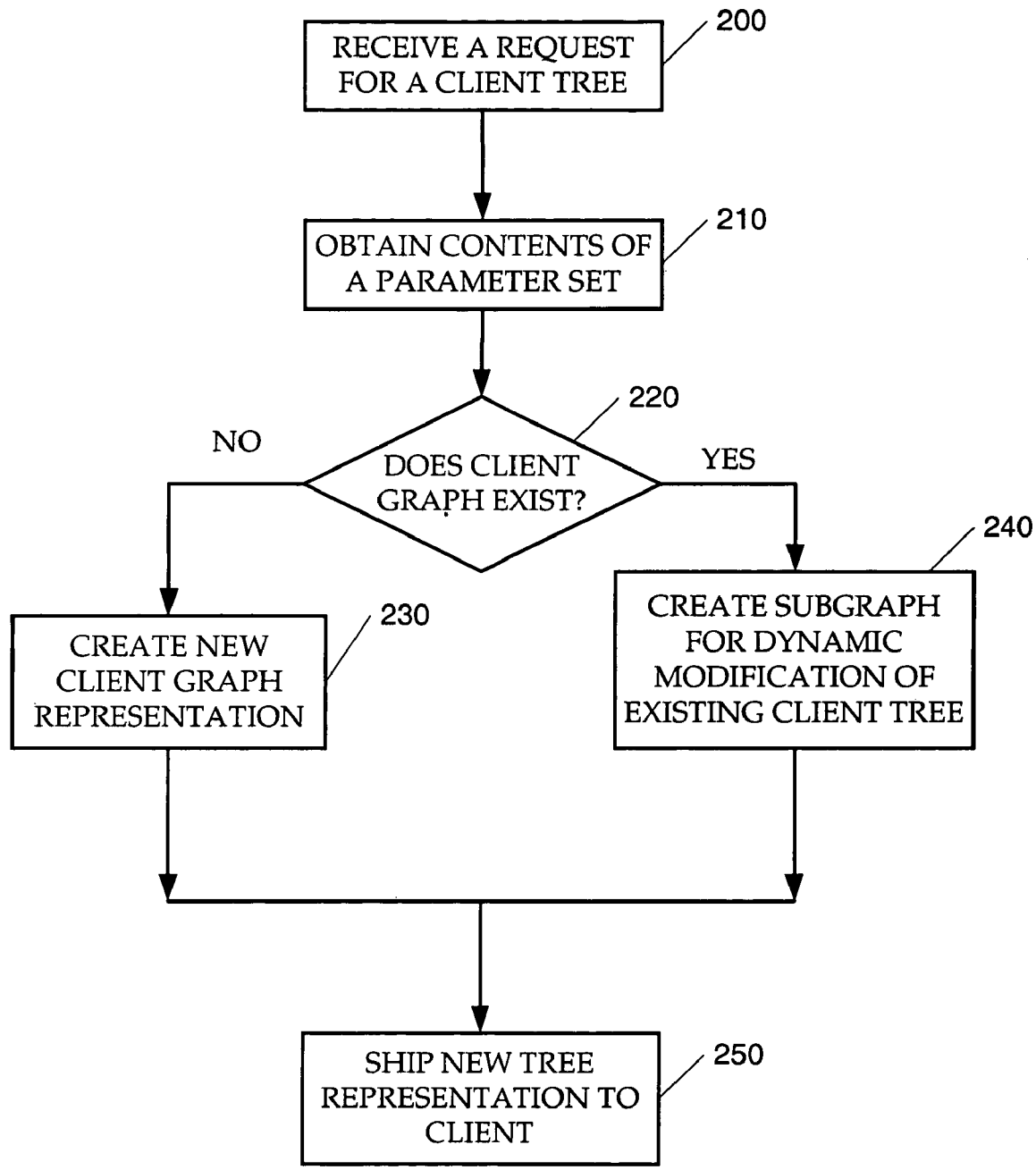
FIG. 2 is a process flow illustrating generation of the client tree from the server tree in accordance with an embodiment of the invention.

FIG. 2 shows a process for generating and installing a client actor tree from a server actor tree. A request is received from the client for a client-tree representation of the desired application from the client in step 200. In one or more embodiments, the request may be in the form of an object that is obtained from the server. For example, it could be that a dynamic change occurred in the server actor tree and the server needs to update an existing client actor tree. It could also be an object provided by a client in a federated environment. Thus, at step 200, all that is required is a need for either a new client tree or an update to an existing tree.

At step 210, a parameter set for the specific client and environment is obtained. For example, the parameter set may be an object provided during application initialization in the server. In one or more embodiments, the parameter set is obtained from the client. The parameter set may also be resident in the source actor. For example, the source actor may have built-in definitions of the applicable client types. At step 220, a determination is made whether a client tree representation has previously been created for this client. If so, the server creates the client graph representation at step 230 using the peeling process described below, otherwise, it creates a subgraph with which to dynamically modify the existing client actor tree at step 240. After the client graph representation is generated at step 230 or the client subgraph is generated at step 240, the client graph or subgraph representation is shipped to the client in the form of pre-initialized objects in a secure manner for construction or modification of the client side actor tree.

Peeling Process

A compound ad hoc server application is required to dynamically create a client graph object for an application that works regardless of the method of constructing the client application actors. The server actor tree can be traversed in a parametric manner to create a desired client actor tree. Since client actor trees may differ, i.e. depending on the needs of the client, parametric determination of the server actors represented in each client tree is performed.

The peeling process provides a unique way of developing the client from the server side. Defining the client from the server side allows the designer to design only the server side (i.e. source) actors. The server side actors plug into the tree in some arbitrary place to create a compound tree of actors. At different places and instances, and at client desired times, a set of API's are available that allow traversal of the entire compound tree of server actors to produce the functional client tree.

Figure 4:
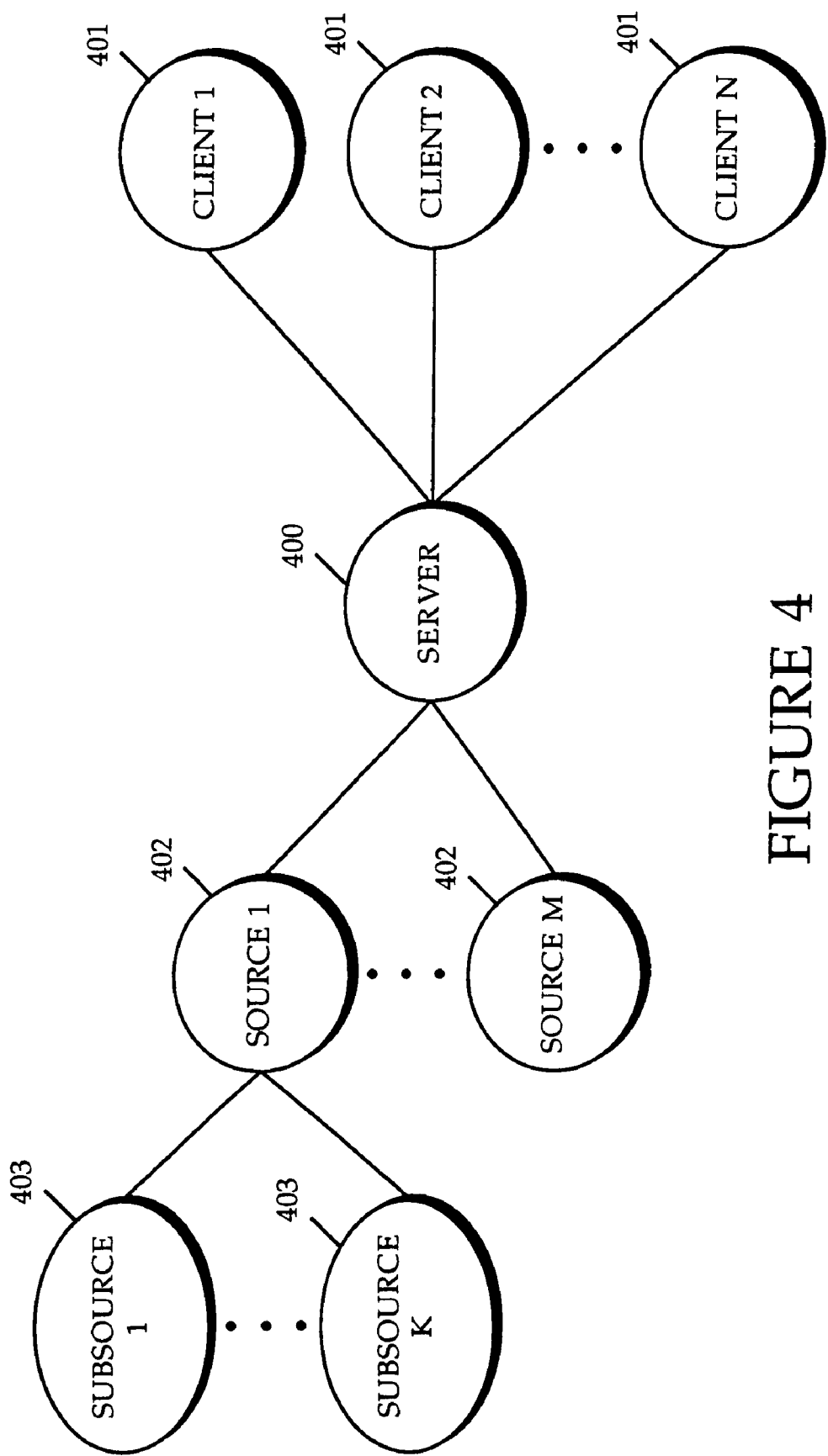
FIG. 4 is a block diagram of a client-server system with external sources in accordance with an embodiment of the invention.

FIG. 4 is a block diagram of a client-server environment with distribution sources and subsources in accordance with one or more embodiments of the invention. As shown, a server component 400 is linked to one or more (1-N) client components 401 and one or more (1-M) distribution sources 402. Each distribution source may also be serviced by one or more (1-K) distribution subsources 403 (shown here linked to distribution source 1).

The content provided by each distribution subsource is composited with the content of its respective parent distribution source, so that nested content sourcing may be implemented transparently to the server component 400, as well as any further distribution sources higher in the distribution hierarchy. That is, a parent distribution source is aware of its child distribution subsource, however, for some embodiments, the parent will be unaware of the existence of any "grandchildren" distribution subsources beneath the level of its child subsource.

In one or more embodiments, application security rules and operating boundaries, sometimes referred to as security "sandboxes," are defined at each layer in the distribution source hierarchy such that each parent distribution source/subsource (as well as the server component 400) is prevented from intentionally or unintentionally disturbing the specific content provided from distribution subsources lower in the distribution hierarchy, or from interfering with the operation of the lower distribution sources/subsources. Distribution sources and subsources can therefore be ensured of the quality and accuracy of their respective content when that content is ultimately provided via server component 400 to one or more clients 401.

A complementary mechanism is provided by which the top-level distribution source 402 may interact with the corresponding distribution source actor in the server component 400. The same or similar mechanism may be used by distribution subsources to interact with a corresponding actor in a respective parent distribution source. The server actor tree thus formed, the peeling process generates the respective client tree representation based on predetermined set of parameters.

Figure 5:
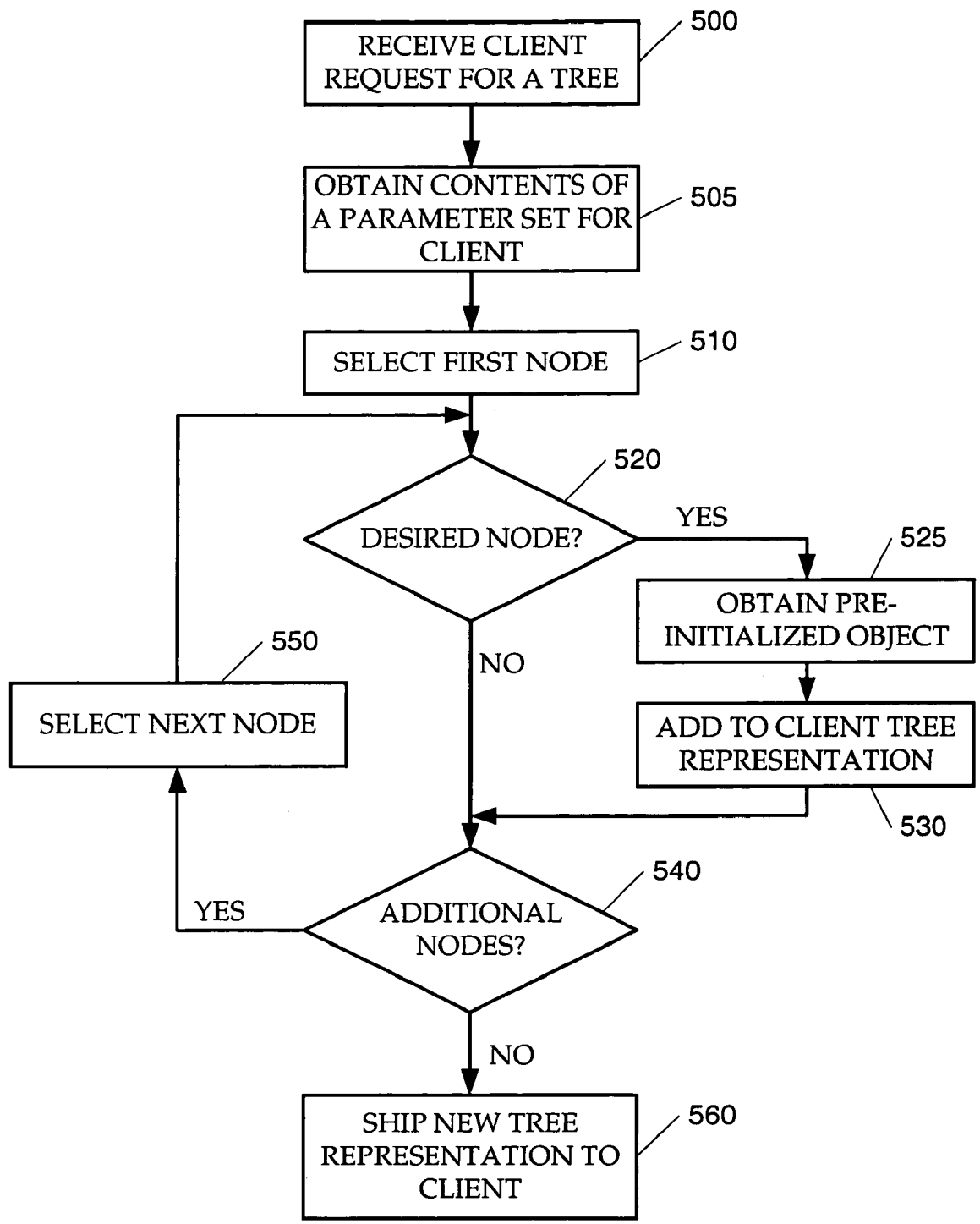
FIG. 5 is a flow diagram illustrating the peeling process in accordance with an embodiment of the invention.

FIG. 5 is a flow diagram of the peeling process. At step 500, a client on the network requests a tree representation from the server (i.e. source provider). At step 505, the server obtains the parameter set for the requesting client. The parameter set contains data and/or criteria for generating the client tree representation. The parameter set may be obtained from the client, the server, or from the source actor itself. For example, the parameter set may be obtained from an object provided by the client or from data stored on the network for such client configuration. After obtaining the parameter set, the server starts the peeling process to generate the client tree representation.

At step 510, the server selects a first node from its source actor tree. In one or more embodiments, the starting (i.e. first) node is the root node and proceeds branch by branch. At step 520, a determination is made whether based on the information in the parameter set, the selected server node is a desired node in the client actor tree. A server node may be a desired node if the client ordered that particular node, or if the node itself satisfies other criteria for inclusion. For example, the peeling process may query the selected node to determine, at step 520, if it is the node ordered by the client.

In one or more embodiments, the selected server actor node would maintain the criteria for inclusion in the form of data, for example. The peeling process would have access to the data in the node and uses it for determination whether the current criteria are met. For example, the peeling process may compare the data in the node with data in a parameter obtained for the client to make the determination.

If a determination is made at step 520 that the selected node is a desired node, then at step 525 a pre-initialized object containing methods and attributes for the construction and initialization of the client graph (i.e. a fully initialized description of the client node) is obtained from the selected server actor node. At step 530 the pre-initialized object of the selected node is added to the client-tree representation, otherwise, it is ignored. In either case, processing proceeds to step 540. At step 540, the peeling process determines if there are any remaining server-actor nodes for processing. If there are any remaining nodes, processing continues at step 550 to select the next node and then the cycle continues to step 520 until all the nodes and branches in the server actor tree have been traversed.

During traversal of the server actor tree on a node-by-node basis, when a desired node is encountered, at step 530, the server requests for the fully initialized description of the client node from the node's API. The node's API provides the information in the form of an object that can be sent to the client in a tree structure. A client actor tree representation is generated at completion of processing of all the nodes in the server actor tree. At step 560 the client actor tree representation is shipped to the client via secure communication. At the client side, the client uses this representation to create its unique tree.

The peeling process allows the server graph to be traversed in a selective manner to produce a client graph from only a subset of the server graph. It also provides the server the ability to produce a multiplicity of client graphs (e.g. for different clients) from different subsets of its server graph.

Embodiment of a Processing Environment

An embodiment of the invention is directed, though not limited, to distributed applications, such as those in which a server application serves one or more client applications. Such systems may be implemented using object-oriented programming environments that produce executable software objects. To facilitate object compatibility between the client and server, the software objects may be implemented in a platform independent manner, or the client and server systems may share common or compatible operating platforms. The clients and server may execute within separate machine or virtual machine runtime environments, within a single runtime environment, or a combination of the foregoing arrangements. The following description refers to an embodiment of a virtual machine-based runtime environment, though it will be obvious that the invention is not limited to such.

Applications typically comprise one or more object classes. Classes written in high-level programming languages, such as the Java™ programming language, may be compiled into machine independent bytecode class files. Alternatively, classes may be compiled into machine dependent, executable program code for direct execution by a given hardware platform. In the machine independent case, each class file contains code and data in a platform-independent format called the class file format. The computer system acting as the execution vehicle contains a program called a virtual machine, which is responsible for executing the code in each class file. (A hardware system may also be used that directly executes bytecode of class files.)

In a virtual machine environment, the classes of an application are loaded on demand from the network (stored on a server), or from a local file system, when first referenced during the application's execution. The virtual machine locates and loads each class file, parses the class file format, allocates memory for the class's various components, and links the class with other already loaded classes. This process makes the code in the class readily executable by the virtual machine.

Figure 6:
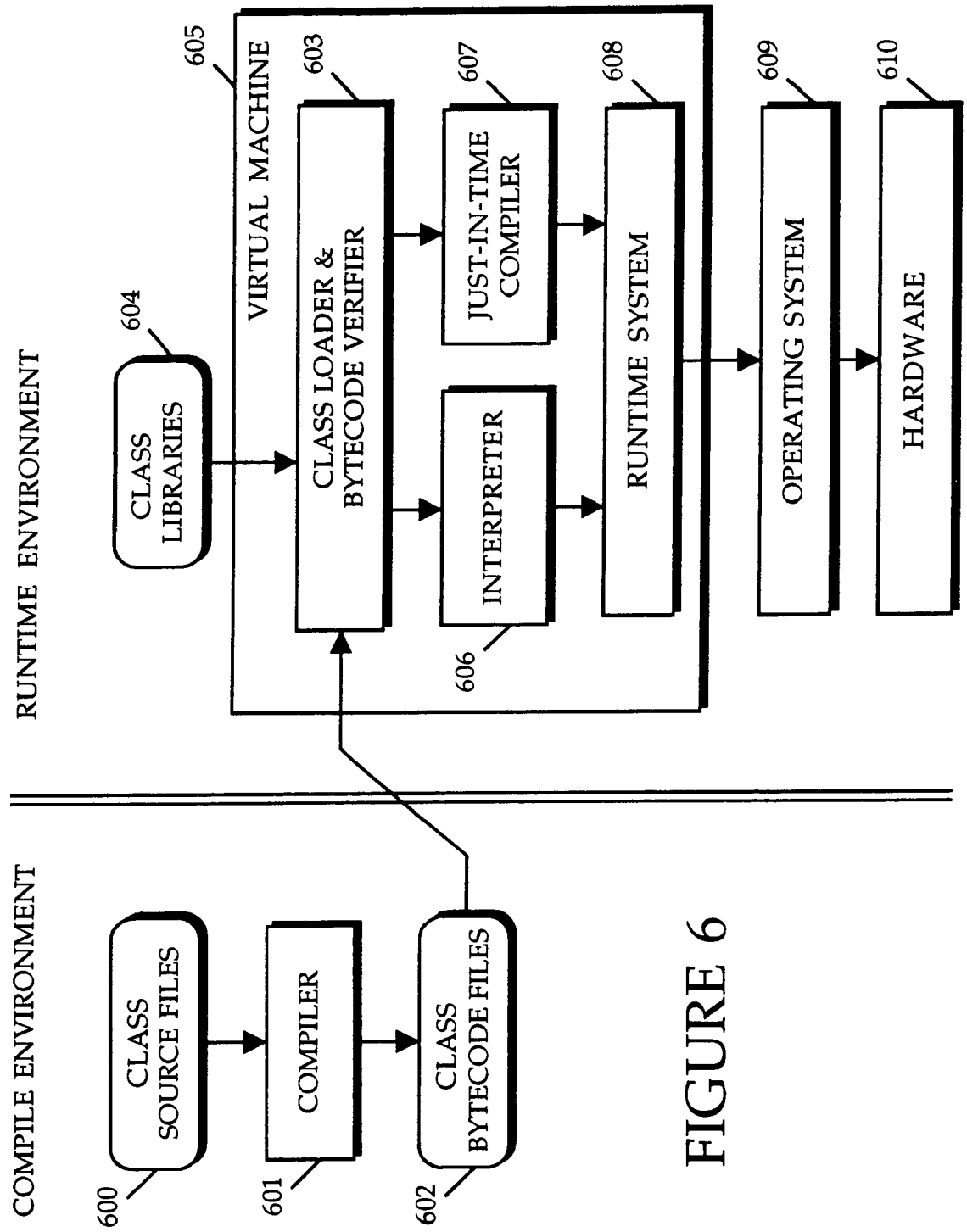
FIG. 6 is a block diagram of a processing environment comprising an object-oriented runtime environment capable of providing a suitable software execution environment for an embodiment of the invention.

FIG. 6 illustrates the compile and runtime environments for an example processing system. In the compile environment, a software developer creates source files 600, which contain the programmer readable class definitions written in the source programming language, including data structures, method implementations and references to other classes. Source files 600 are provided to pre-compiler 601, which compiles source files 600 into ".class" files 602 that contain bytecodes executable by a virtual machine. Bytecode class files 602 are stored (e.g., in temporary or permanent storage) on a server, and are available for download over a network. Alternatively, bytecode class files 602 may be stored locally in a directory on the client platform.

The runtime environment contains a virtual machine (VM) 605 which is able to execute bytecode class files and execute native operating system ("O/S") calls to operating system 609 when necessary during execution. Virtual machine 605 provides a level of abstraction between the machine independence of the bytecode classes and the machine-dependent instruction set of the underlying computer hardware 610, as well as the platform-dependent calls of operating system 609.

Class loader and bytecode verifier ("class loader") 603 is responsible for loading bytecode class files 602 and supporting class libraries 604 into virtual machine 605 as needed. Class loader 603 also verifies the bytecodes of each class file to maintain proper execution and enforcement of security rules. Within the context of runtime system 608, either an interpreter 606 executes the bytecodes directly, or a "just-in-time" (JIT) compiler 607 transforms the bytecodes into machine code, so that they can be executed by the processor (or processors) in hardware 610.

The runtime system 608 of virtual machine 605 supports a general stack architecture. The manner in which this general stack architecture is supported by the underlying hardware 610 is determined by the particular virtual machine implementation, and reflected in the way the bytecodes are interpreted or JIT-compiled. Other elements of the runtime system include thread management (e.g., scheduling) and garbage collection mechanisms.

Embodiment of Computer Execution Environment (Hardware)

Figure 7:
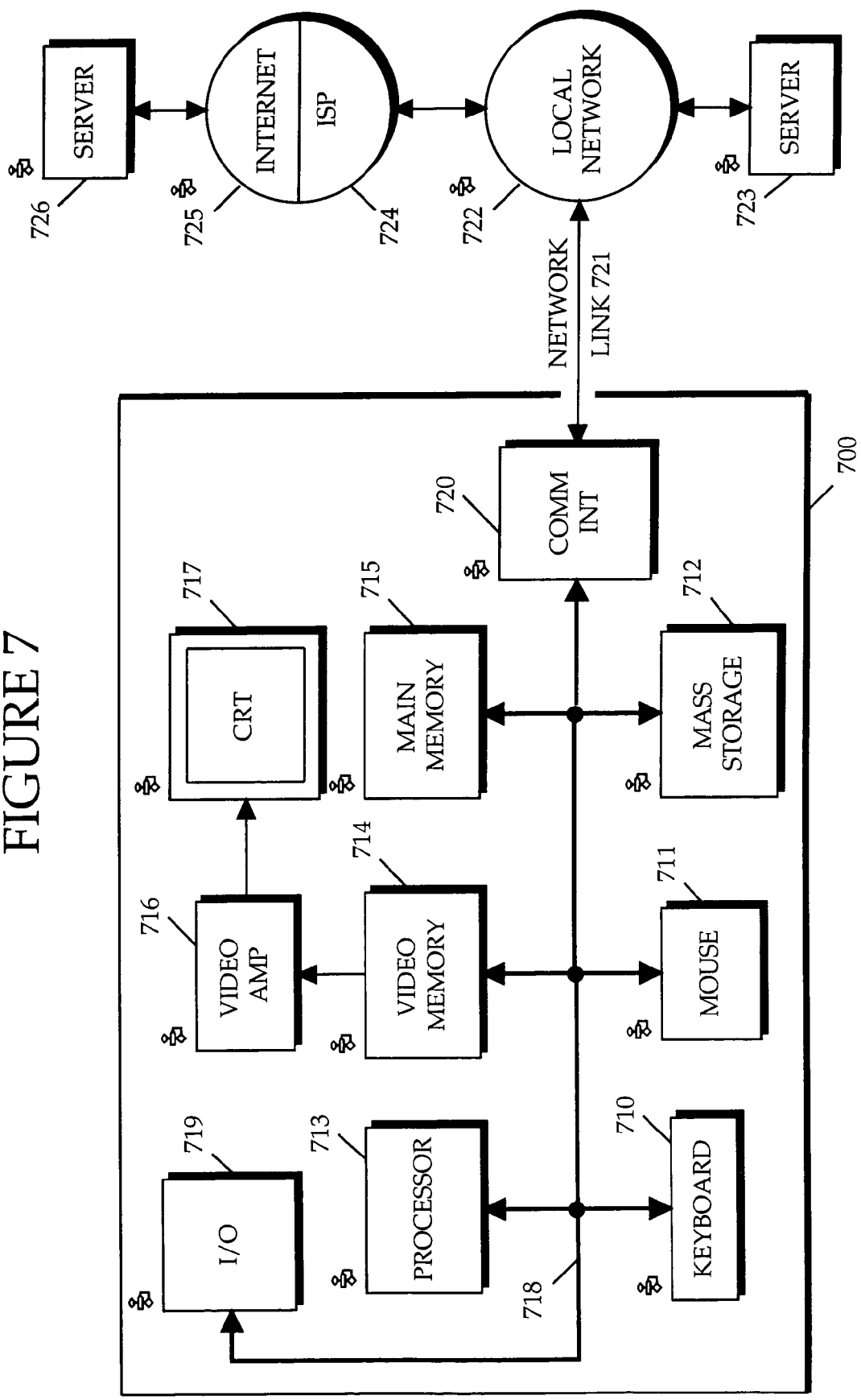
FIG. 7 is a block diagram of one embodiment of a computer system capable of providing a suitable hardware execution environment for an embodiment of the invention.

An embodiment of the invention can be implemented as computer software in the form of computer readable code executed on any computer processing platform, or in the form of software (e.g., bytecode class files) that is executable within a runtime environment running on such a processing platform. An embodiment of the invention may be implemented in any type of computer system or programming or processing environment, including embedded devices (e.g., web phones, set-top boxes, etc.) and "thin" client processing environments (e.g., network computers (NC's), etc.). An example of a general computer system is illustrated in FIG. 7. The computer system described below is for purposes of example only.

In FIG. 7, keyboard 710 and mouse 711 are coupled to a system bus 718. The keyboard and mouse are for introducing user input to the computer system and communicating that user input to processor 713. Other suitable input devices may be used in addition to, or in place of, the mouse 711 and keyboard 710. I/O (input/output) unit 719 coupled to system bus 718 represents such I/O elements as a printer, A/V (audio/video) I/O, etc.

Computer 700 includes a video memory 714, main memory 715 and mass storage 712, all coupled to system bus 718 along with keyboard 710, mouse 711 and processor 713. The mass storage 712 may include both fixed and removable media, such as magnetic, optical or magnetic optical storage systems or any other available mass storage technology. Bus 718 may contain, for example, address lines for addressing video memory 714 or main memory 715. The system bus 718 also includes, for example, a data bus for transferring data between and among the components, such as processor 713, main memory 715, video memory 714 and mass storage 712. Alternatively, multiplexed data/address lines may be used instead of separate data and address lines.

In one embodiment of the invention, the processor 713 is a SPARC™ microprocessor from Sun Microsystems, Inc. or a microprocessor manufactured by Intel, such as the 80×86, or Pentium processor, or a microprocessor manufactured by Motorola, such as the 680×0 processor. However, any other suitable microprocessor or microcomputer may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the cathode ray tube (CRT) raster monitor 717. Video amplifier 716 is well known in the art and may be implemented by any suitable apparatus. This circuitry converts pixel data stored in video memory 714 to a raster signal suitable for use by monitor 717. Monitor 717 is a type of monitor suitable for displaying graphic images. Alternatively, the video memory could be used to drive a flat panel or liquid crystal display (LCD), or any other suitable data presentation device.

Computer 700 may also include a communication interface 720 coupled to bus 718. Communication interface 720 provides a two-way data communication coupling via a network link 721 to a local network 722. For example, if communication interface 720 is an integrated services digital network (ISDN) card or a modem, communication interface 720 provides a data communication connection to the corresponding type of telephone line, which comprises part of network link 721. If communication interface 720 is a local area network (LAN) card, communication interface 720 provides a data communication connection via network link 721 to a compatible LAN. Communication interface 720 could also be a cable modem or wireless interface. In any such implementation, communication interface 720 sends and receives electrical, electromagnetic or optical signals which carry digital data streams representing various types of information.

Network link 721 typically provides data communication through one or more networks to other data devices. For example, network link 721 may provide a connection through local network 722 to local server computer 723 or to data equipment operated by an Internet Service Provider (ISP) 724. ISP 724 in turn provides data communication services through the world wide packet data communication network now commonly referred to as the "Internet" 725. Local network 722 and Internet 725 both use electrical, electromagnetic or optical signals which carry digital data streams. The signals through the various networks and the signals on network link 721 and through communication interface 720, which carry the digital data to and from computer 700, are exemplary forms of carrier waves transporting the information.

Computer 700 can send messages and receive data, including program code, through the network(s), network link 721, and communication interface 720. In the Internet example, remote server computer 726 might transmit a requested code for an application program through Internet 725, ISP 724, local network 722 and communication interface 720.

The received code may be executed by processor 713 as it is received, and/or stored in mass storage 712, or other non-volatile storage for later execution. In this manner, computer 700 may obtain application code in the form of a carrier wave. Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

Thus, a method and apparatus for organizing elements of a server application in a client-server system have been described in conjunction with one or more specific embodiments. The invention is defined by the claims and their full scope of equivalents.

The invention claimed is:

1. In a computer system, a method comprising:
generating one or more actors on a server, wherein each of said one or more actors is a functional component of a distributed application;
linking said one or more actors on the server in a first hierarchical tree;
generating a dataset corresponding to a second hierarchical tree, wherein the second hierarchical tree is a subset of the first hierarchical tree; wherein each node in said first hierarchical tree comprises a source actor, each node in the replicated second hierarchical tree comprises a member actor, and each member actor corresponds to a respective source actor and wherein a first Portion of a function to be performed by the distributed application is executed by the member actor and a second portion of the function to be performed by the distributed application is executed by the source actor;
sending said dataset to a client;

replicating the second hierarchical tree in said client using said dataset, wherein said replicating comprises generating one or more peer actors on the client, and wherein said one or more peer actors on the client comprise executable code for performing tasks that are in addition to tasks performed by the one or more actors on the server; and providing a communication link between each of said one or more peer actors of the replicated second hierarchical tree on the client and a corresponding actor of the second hierarchical tree on the server.

2. The method of claim 1, wherein each said actor comprises a tree of hierarchically linked nodes, said nodes comprising one or more objects.

3. The method of claim 2, wherein said nodes further comprise one or more nested actors.

4. The method of claim 1, wherein said sending said dataset comprises sending said dataset via a secure communication network.

5. The method of claim 1, wherein said generating a dataset comprises:
obtaining inclusion criteria from one or more parameter sets;
traversing said first hierarchical tree to determine nodes of said first hierarchical tree that comply with said inclusion criteria;
obtaining a pre-initialized object for each of said nodes that comply with said inclusion criteria; generating a client graph comprising said pre-initialized objects.

6. The method of claim 5, wherein said traversing said first hierarchical tree is on a node-by-node basis starting from the root node and proceeding through all the leaf nodes.

7. The method of claim 5, wherein said dataset is indicative of the full client graph.

8. The method of claim 1, wherein said dataset comprises a subgraph for updating the replicated second hierarchical tree of said client.

9. The method of claim 5, wherein said pre-initialized-object comprises methods and attributes for construction and initialization of said client graph.

10. A computer program product comprising:
a computer readable medium having computer program code embodied therein for creating and deploying client side actors for a server application, said computerreadable medium comprising computer program code configured to cause a computer to:
generate one or more actors on a server, wherein each of said one or more actors is a functional component of a distributed application; link said one or more actors on the server in a first hierarchical tree;
generate a dataset corresponding to a second hierarchical tree, wherein the second hierarchical tree is a subset of the first hierarchical tree; wherein each node in said first hierarchical tree comprises a source actor, each node in the replicated second hierarchical tree comprises a member actor, and each member actor corresponds to a respective source actor and wherein a first portion of a function to be performed by the distributed application is executed by the member actor and a second portion of the function to be performed by the distributed application is executed by the source actor;
send said dataset to a client;
replicate the second hierarchical tree in said client using said dataset, wherein to replicate the second hierarchical tree, the computer program code is further configured to cause a computer to generate one or more peer actors on the client, and wherein said one or more peer actors on the client comprise executable code for performing tasks that are in addition to tasks performed by the one or more actors on the server; and
provide a communication link between each of said one or more peer actors of the replicated second hierarchical tree on the client and a corresponding actor of the second hierarchical tree on the server.

11. The computer program product of claim 10, wherein each said actor comprises a tree of hierarchically linked nodes, said nodes comprising one or more objects.

12. The computer program product of claim 11, wherein said nodes further comprise one or more nested actors.

13. The computer program product of claim 10, wherein said send said dataset comprises sending said dataset using a secure communication network.

14. The computer program product of claim 10, wherein said generate a dataset comprises:
obtaining inclusion criteria from a parameter set;
traversing said first hierarchical tree to determine nodes of said first hierarchical tree that comply with said inclusion criteria;
obtaining a pre-initialized object for each of said nodes that comply with said inclusion criteria;
generating a client graph comprising said pre-initialized objects.

15. The computer program product of claim 14, wherein said traversing said first hierarchical tree is on a node-by-node basis starting from the root node and proceeding through all the leaf nodes.

16. The computer program product of claim 14, wherein said dataset is indicative of the full client graph.

17. The computer program product of claim 10, wherein said dataset comprises a subgraph for updating the replicated second hierarchical tree of said client.

18. The computer program product of claim 13, wherein said pre-initialized object comprises methods and attributes for construction and initialization of said client graph.

19. An apparatus comprising:
a server comprising one or more server actors linked in a source hierarchical tree, wherein each of said one or more actors is a functional component of a distributed application;
one or more clients, each of said clients coupled to the server via a respective communication interface;
wherein said server is configured to:
generate a dataset for each of said one or more clients, wherein each dataset corresponds to a respective subset of the source hierarchical tree;
wherein each node in said first hierarchical tree comprises a source actor, each node in the replicated second hierarchical tree comprises a member actor, and each member actor corresponds to a respective source actor and wherein a first portion of a function to be performed by the distributed application is executed by the member actor and a second portion of the function to be performed by the distributed application is executed by the source actor;
send each dataset to the respective client via the respective communication interface;
wherein each of said one of more clients is configured to replicate a respective subset of the source hierarchical tree based on said dataset, wherein to replicate a respective subset of the source hierarchical tree, each of said one or more clients is further configured to generate one or more peer actors on the client;

wherein said one or more peer actors on the client comprise executable code for performing tasks that are in addition to tasks performed by the one or more actors on the server; and provide a communication link between each of said one or more peer actors of the replicated second hierarchical tree on the client and a corresponding actor of the second hierarchical tree on the server.

20. The apparatus of claim 19, wherein each said actor comprises a tree of hierarchically linked nodes, said nodes comprising one or more objects.

21. The apparatus of claim 20, wherein said nodes further comprise one or more nested actors.

22. The apparatus of claim 19, wherein each of said communication interfaces is secured.

23. The apparatus of claim 19, wherein said generating a dataset comprises:

obtaining inclusion criteria from a parameter set;

traversing said source hierarchical tree to determine nodes of said source hierarchical tree that comply with said inclusion criteria;

obtaining a pre-initialized object for each of said nodes that comply with said inclusion criteria;

generating a client graph comprising said pre-initialized objects.

24. The apparatus of claim 23, wherein said traversing said source hierarchical tree is on a node-by-node basis.

25. The apparatus of claim 23, wherein said dataset is indicative of the full client graph.

26. The apparatus of claim 19, wherein said dataset comprises a subgraph for updating the replicated subset of the source hierarchical tree of said client.

27. The apparatus of claim 23, wherein said pre-initialized object comprises methods and attributes for construction and initialization of said client graph.

28. The method of claim 1, wherein the function to be performed by the distributed application comprises rendering a scene.

29. The computer program product of claim 10, wherein the function to be performed by the distributed application comprises rendering a scene.

30. The apparatus of claim 19, wherein the function to be performed by the distributed application comprises rendering a scene.

* * * * *